W. A. HENDRYX.
DEWATERING DEVICE.
APPLICATION FILED AUG. 28, 1911.
1,053,172.
Patented Feb. 18, 1913.
2 SHEETS—SHEET 1.
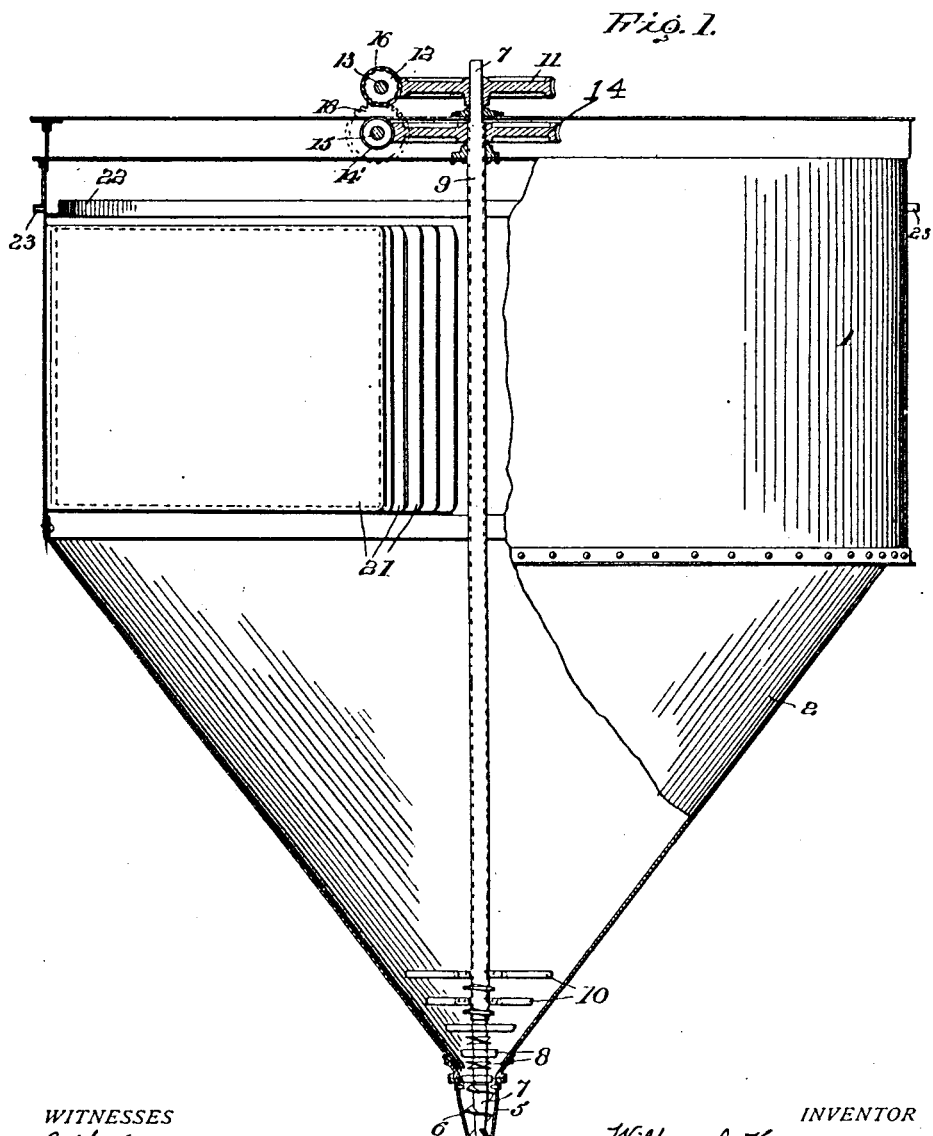

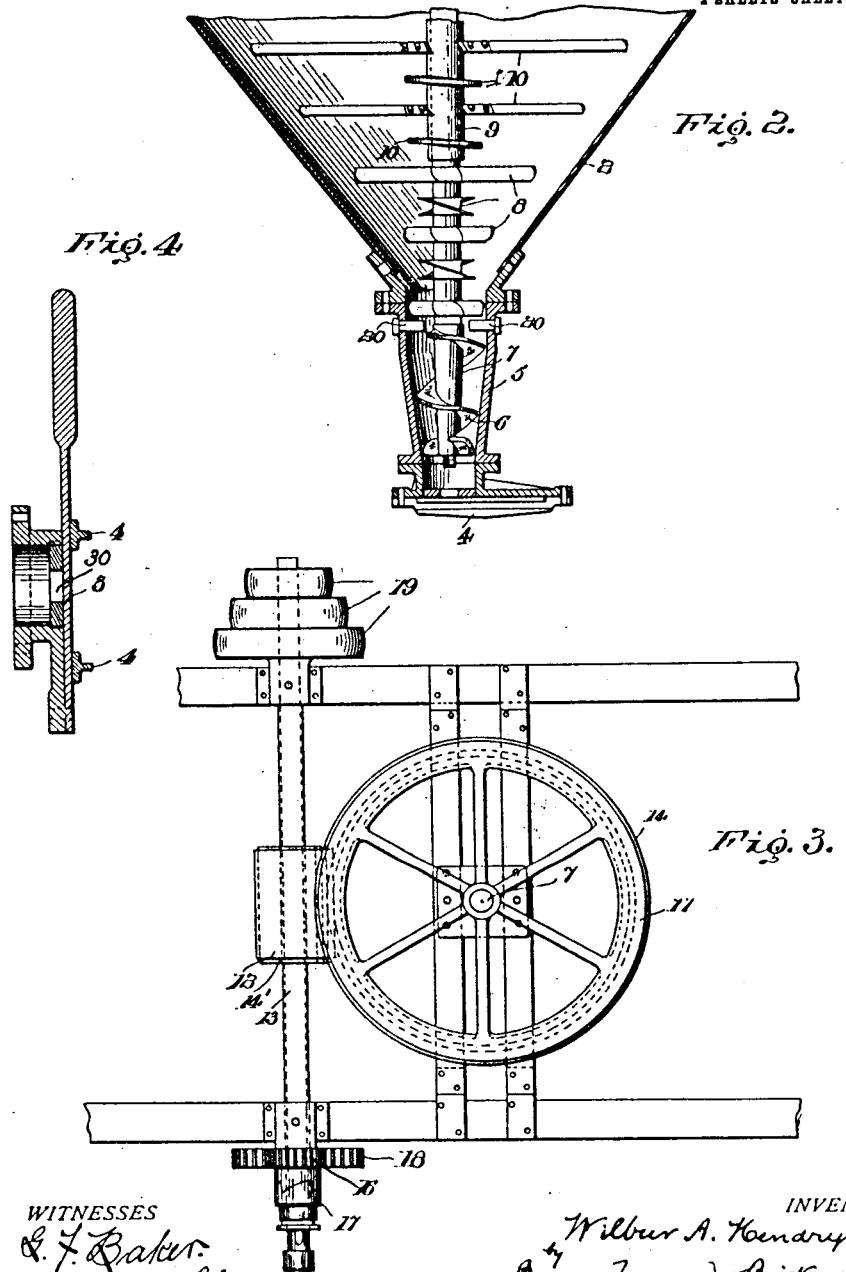

UNITED STATES PATENT OFFICE.

WILBUR ALSON HENDRYX, OF NEW YORK, N. Y., ASSIGNOR TO HENDRYX CYANIDE MACHINERY COMPANY, OF NEW YORK, N. Y., A CORPORATION OF MAINE.

DEWATERING DEVICE.

1,053,172.

Specification of Letters Patent. Patented Feb. 18, 1913.

Application filed August 28, 1911. Serial No. 646,519.

*To all whom it may concern:*

Be it known that I, WILBUR A. HENDRYX, a citizen of the United States, residing at New York city, in the county of New York and State of New York, have invented certain new and useful Improvements in Dewatering Devices, of which the following is a specification.

My invention relates to an improvement in the dewatering device shown in my Patent No. 960,546, patented June 7, 1910.

In the drawings—Figure 1 is an elevation, partly in section. Fig. 2 is a section, on a larger scale than Fig. 1 of the bottom portion of the tank. Fig. 3 is a plan showing the means for driving the screw-shafts. Fig. 4 is a detail showing the closing gate.

Secured to the lower end of the conical portion 2 is a centrally located nozzle or tube 5, preferably tapered, as shown. Arranged to rotate within this nozzle 5, is a screw 6, secured to shaft 7, which also has secured to it propeller blades 8—8, located within the lower portion of the cone. The lower end of the nozzle has an opening 30, controlled by a gate 3, held up to its seat by guides 4—4 (Fig. 4). Surrounding the shaft 7 is a hollow shaft 9, on which are fastened propeller blades 10, 10, this shaft 9 being arranged to rotate at a considerably slower speed than shaft 7. The shaft 7 is driven by a screw gear 11, meshing with a screw 12 on shaft 13. The hollow shaft 9 is similarly driven by a screw gear 14 meshing with a screw 14' on a shaft 15. On the shaft 13 is a spur-gear 16 arranged to be clutched thereto by a clutch 17. Meshing with gear 16 is a larger gear 18 fixed on shaft 15. This arrangement permits the solid shaft 7 to be driven without rotating the hollow shaft 9. The shaft 13 is driven by pulleys 19 from any suitable source of power.

Located near the top of the nozzle 5 are flat blades 20, 20, which prevent the rotation of the plug of material as it is forced through the nozzle. 21, 21, are a series of filter cells, shown as mounted in the upper portion of the tank. These may, however, be omitted, if desired. 22 is a launder extending around the top of the tank, for collecting and discharging, through pipes 23, the liquid at the upper portion of the tank.

In operation the crushed ore or other material, together with water or solution, is run into the tank. The solids are allowed to settle to the bottom of the tank, while the liquid rises and passes off through the launder 22 and pipes 23, or through the filters 21, if they are used, a considerable amount of settled solids being allowed to accumulate in the bottom of the tank. As soon as the tank contains sufficient settled solids the gate 3 is opened and the shaft 7 revolved and the settled mass is by the action of the screws forced through the nozzle thereby compacting it, and expressing the liquid, which works its way back into the tank, the solids being delivered in a practically dewatered condition.

The blades 8, 8 assist in the delivery of material to the screw 6, and the more slowly rotating blades 10 on hollow shaft 9, which may rotate at only one-fifth the speed of the shaft 7, also assist in this action without injurious agitation of the settled solids.

In case the apparatus should be left for a considerable time, so that the settled material has compacted, the solid shaft carrying the delivery screw 7 and the smaller wings or blades is started, thereby loosening up the material and discharging a sufficient amount to permit the starting of the hollow shaft and larger blades by throwing in the clutch.

The tank may be provided with a launder, decanting cocks or a siphon to take off the clear solution.

I claim:

1. A dewatering apparatus comprising a settling tank having a conical lower portion provided with a delivery tube, a screw in said tube for forcing settled material therethrough, additional means arranged to rotate within said conical portion for delivering material to said tube, means for rotating said screw more rapidly than said additional means, and means for throwing the said latter means out of action.

2. A dewatering apparatus comprising a settling tank having a conical lower portion provided with a delivery tube, a screw in said tube for forcing settled material therethrough, additional means arranged to rotate within said conical portion for delivering material to said tube, and means for rotating said screw more rapidly than said additional means.

3. A dewatering apparatus comprising a settling tank having a conical lower portion provided with a delivery tube, a shaft extending into said tube, a screw secured to said shaft and located within said tube, propeller blades also secured to said shaft and located within the lower portion of the cone, means for rotating the shaft, a sleeve rotatably secured on said shaft above said propeller blades, said sleeve itself carrying propeller blades, means for rotating said sleeve, and means for throwing the said second rotating means out of action.

4. A dewatering apparatus comprising a settling tank having a conical lower portion provided with a delivery tube, a screw in said tube for forcing settled material therethrough, additional means arranged to rotate within said conical portion for delivering material to the said tube, a driving gear for rotating the said screw and the said additional means, and means for disconnecting the last additional means from the said driving gear.

5. A dewatering apparatus comprising a settling tank having a conical lower portion provided with a central delivery tube, a shaft extending into said tube, a screw secured to said shaft and located within said tube, propeller blades also secured to said shaft and located within the lower portion of the cone, means for rotating the shaft, a sleeve rotatably secured on said shaft above said propeller blades, said sleeve itself carrying propeller blades, and separate means for rotating said sleeve.

6. A dewatering apparatus comprising a settling tank having a conical lower portion provided with a central delivery tube, a shaft extending into said tube, a screw secured to said shaft and located within said tube, propeller blades also secured to said shaft and located within the lower portion of the cone, means for rotating the shaft, a sleeve rotatably secured on said shaft above said propeller blades, said sleeve itself carrying propeller blades, and separate means for rotating said sleeve, the rotating means arranged to rotate the shaft more rapidly than the sleeve.

7. A dewatering apparatus comprising a settling tank having a conical lower portion provided with a central delivery tube, a shaft extending into said tube, a screw secured to said shaft and located within said tube, a sleeve rotatably secured on said shaft above said screw, said sleeve itself carrying propeller blades, and separate means for rotating said sleeve.

8. A dewatering apparatus comprising a settling tank having a conical lower portion provided with a central delivery tube, a shaft extending into said tube, a screw secured to said shaft and located within said tube, a sleeve rotatably secured to said shaft above said screw, said sleeve itself carrying propeller blades, and separate means for rotating said sleeve, the rotating means arranged to rotate the shaft more rapidly than the sleeve.

9. A dewatering apparatus comprising a settling tank having a conical lower portion, a delivery tube connected to the bottom of said conical lower portion, a screw in said tube for forcing settled material therethrough, and additional separately actuated means arranged to rotate within said conical portion for loosening up the material within said portion.

In testimony whereof I affix my signature in presence of two witnesses.

WILBUR ALSON HENDRYX.

Witnesses:
MAY FORD,
JAMES L. NESBITT.

Copies of this patent may be obtained for five cents each, by addressing the "Commissioner of Patents, Washington, D. C."